(12) United States Patent
Vasudevan et al.

(10) Patent No.: US 12,462,619 B2
(45) Date of Patent: Nov. 4, 2025

(54) METHODS AND SYSTEM FOR VEHICLE TELEMATICS

(71) Applicant: AZUGA, INC., Fremont, CA (US)

(72) Inventors: Ritvik Vasudevan, Fremont, CA (US); Igor Ferst, Fremont, CA (US); Alexandru Barbur, Fremont, CA (US)

(73) Assignee: AZUGA, INC., Fremont, CA (US)

( * ) Notice: Subject to any disclaimer, the term of this patent is extended or adjusted under 35 U.S.C. 154(b) by 277 days.

(21) Appl. No.: 18/028,019

(22) PCT Filed: Sep. 27, 2021

(86) PCT No.: PCT/US2021/052219
§ 371 (c)(1),
(2) Date: Mar. 23, 2023

(87) PCT Pub. No.: WO2022/067190
PCT Pub. Date: Mar. 31, 2022

(65) Prior Publication Data
US 2023/0343147 A1  Oct. 26, 2023

Related U.S. Application Data

(60) Provisional application No. 63/139,264, filed on Jan. 19, 2021, provisional application No. 63/084,004, filed on Sep. 27, 2020.

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
None
See application file for complete search history.

(56) References Cited

U.S. PATENT DOCUMENTS

| 8,463,798 | B1  | 6/2013 | Claudatos et al. |
| 2006/0217885 | A1* | 9/2006 | Crady ................. G05D 1/0287 701/469 |
| 2008/0054072 | A1  | 3/2008 | Katragadda et al. |

(Continued)

OTHER PUBLICATIONS

Extended European Search Report for Application No. 21873603.1 dated Jun. 7, 2024, 10 pages.

(Continued)

*Primary Examiner* — Thomas S McCormack
(74) *Attorney, Agent, or Firm* — Moser Taboada

(57) ABSTRACT

Methods and system for vehicle telematics are provided. The system, for example, includes an input/output device; and a processor programmed to receive a first query via the input/output; generate an abstract vehicle query that represents a query against local vehicle data configured to be executed on an individual vehicle; send the abstract vehicle query via the input/output device to each of a plurality of vehicles; receive query results from each of the plurality of vehicles that executed the abstract vehicle query based upon local data from each of the plurality of vehicles respectively; compute an aggregated final query result based upon the abstract vehicle query and the query results from each of the plurality of vehicles; and transmit the aggregated final query result to the input/output device.

20 Claims, 7 Drawing Sheets

(56) References Cited

U.S. PATENT DOCUMENTS

| | | |
|---|---|---|
| 2009/0248587 A1 | 10/2009 | Van Buskirk |
| 2011/0208429 A1 | 8/2011 | Zheng et al. |
| 2013/0069803 A1 | 3/2013 | McCormick et al. |
| 2015/0170515 A1 | 6/2015 | Annapureddy et al. |
| 2016/0330394 A1 | 11/2016 | Shahraray et al. |
| 2017/0032589 A1 | 2/2017 | Zagajac et al. |
| 2019/0130665 A1 | 5/2019 | Davidson et al. |
| 2020/0074764 A1 | 3/2020 | Ghanbari et al. |

OTHER PUBLICATIONS

International Search Report and Written Opinion for PCT/US2021/052219 dated Dec. 27, 2021.

\* cited by examiner

METHODS AND SYSTEM FOR VEHICLE TELEMATICS

FIELD

The disclosure relates, generally, to methods and systems for edge based vehicle telematics.

BACKGROUND

Vehicle telematics include the collection, transmission, and analysis of sensor data from vehicles over a wireless telecommunications network and has transformative potential for multiple industries, including automotive, insurance, logistics, and mobility. The data collected by various vehicle sensors can be leveraged to increase driver safety, align insurance premiums with actual driving, inform preventative maintenance, and more.

SUMMARY

Methods and system for vehicle telematics are provided. The system, for example, includes an input/output device; and a processor programmed to receive a first query via the input/output; generate an abstract vehicle query that represents a query against local vehicle data configured to be executed on an individual vehicle; send the abstract vehicle query via the input/output device to each of a plurality of vehicles; receive query results from each of the plurality of vehicles that executed the abstract vehicle query based upon local data from each of the plurality of vehicles respectively; compute an aggregated final query result based upon the abstract vehicle query and the query results from each of the plurality of vehicles; and transmit the aggregated final query result to the input/output device.

The method, for instance, includes receiving a first query via the input/output; generating an abstract vehicle query that represents a query against local vehicle data configured to be executed on an individual vehicle; sending the abstract vehicle query via the input/output device to each of a plurality of vehicles; receiving query results from each of the plurality of vehicles that executed the abstract vehicle query based upon local data from each of the plurality of vehicles respectively; computing an aggregated final query result based upon the abstract vehicle query and the query results from each of the plurality of vehicles; and transmitting the aggregated final query result to the input/output device.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
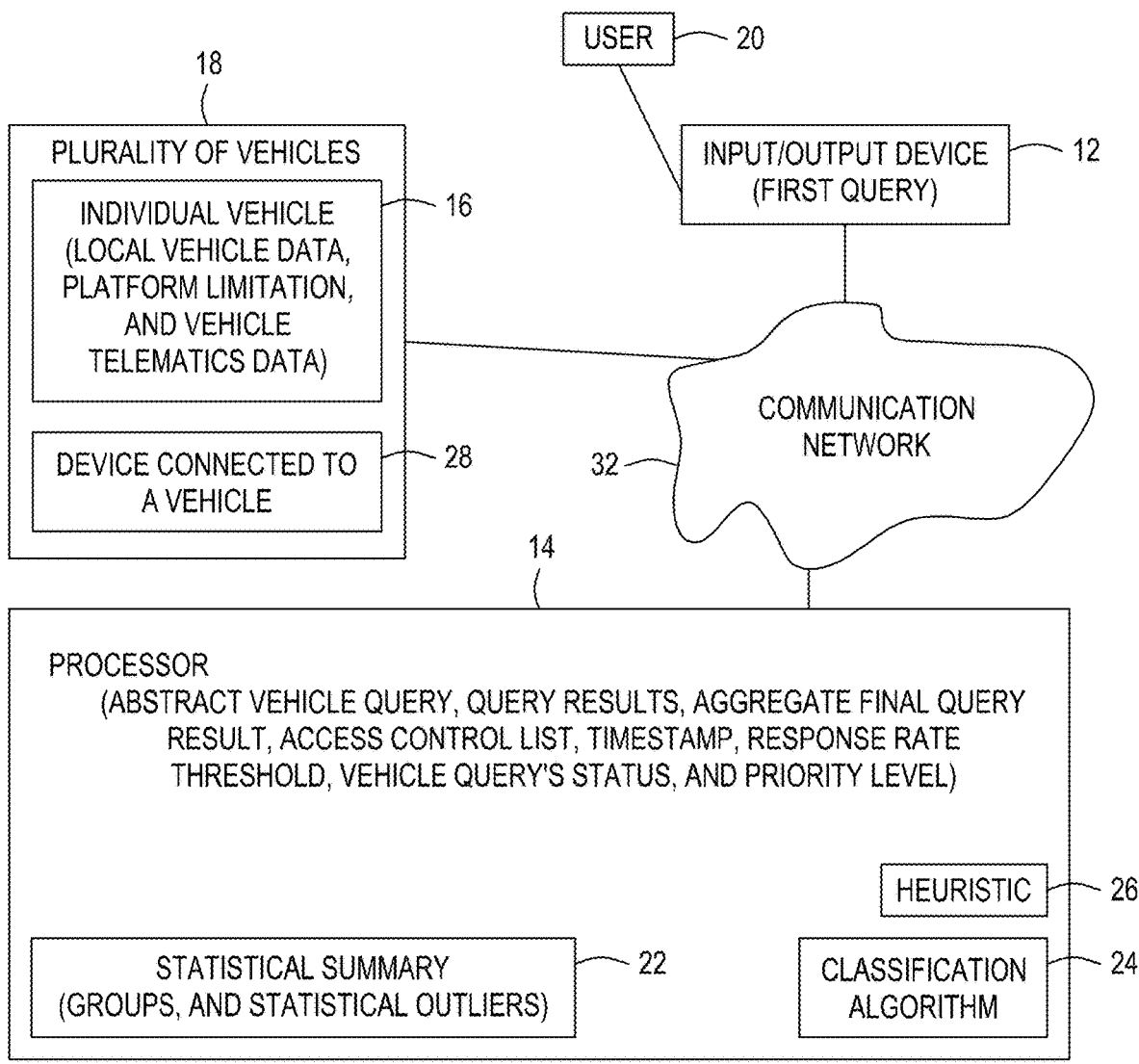
FIG. 1 is a block diagram of a vehicle telematics system, in accordance with an embodiment of the disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

The following detailed description describes techniques (e.g., methods, processes, and systems) that enable distributing queries and models across a fleet of vehicles with heterogeneous architectures. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

In general, vehicles of all kinds—trucks, cars, bikes, even scooters—are all becoming nearly universally connected to the cloud. But the infrastructure to support the emergence of vehicle applications is not sustainable. As enterprises begin to harness the immense value of vehicle data, there is a substantial need for faster, cheaper, and more streamlined ways to query telematics data from the edge devices. Embodiments consistent with the invention provides a system that automatically rewrites telematics programs into an edge-friendly form that can be run at the edge device.

With reference to FIG. 1, in some embodiments consistent with the disclosure, the vehicle telematics system 10 includes an input/output 12 device. The system 10 also includes a processor 14 programmed to receive a first query via the input/output 12, and generate an abstract vehicle query that represents a query against local vehicle data configured to be executed on an individual vehicle 16. The system 10 sends the abstract vehicle query via the input/output device 12 to each of a plurality of vehicles 18, and receives query results from each of the plurality of vehicles that executed the abstract vehicle query based upon local data from each of the plurality of vehicles respectively. The system 10 computes an aggregated final query result based upon the abstract vehicle query and the query results from each of the plurality of vehicles 18, and transmits the aggregated final query result to the input/output device 12.

In some embodiments, the aggregated final query result includes a statistical summary 22 of how the vehicle results are at least one of configured into groups and identified as statistical outliers. In other embodiments, the plurality of vehicles 18 are at least one of restricted according to a platform limitation for each of the plurality of vehicles respectively, according to an access control list for each of the plurality of vehicles respectively, and the plurality of vehicles queried is restricted by at least one of a classification algorithm 24 and a heuristic 26.

In some embodiments, the first query and abstract vehicle query request vehicle telematics data collected by the vehicle or a device 28 connected to the vehicle 16. In other embodiments, the abstract vehicle query includes a timestamp where each of the plurality of vehicles 18 will continue to re-execute and send its query result on an ongoing basis until expiration, and the system 10 will continue to collect query results until expiration.

In some embodiments, the abstract vehicle query includes a response rate threshold and the system 10 will wait until the response rate threshold has been met to compute and transmit the query result of the abstract vehicle query. In other embodiments, the abstract vehicle query while running and query results are being received, the system 10 reports on the abstract vehicle query's status and progress including at least one of how many of the plurality of vehicles 18 have been sending query results and at what frequency, how many failed to complete the abstract vehicle query, and how many are unresponsive.

In some embodiments, the abstract vehicle query includes a priority level that controls abstract vehicle query order of at least one of execution, storage, and response by each vehicle 16. In other embodiments, the priority level includes a high priority level that is executed before a low priority level, the high priority level query result is transmitted to the processor 14 before the low priority level query result, and any abstract vehicle query with an expired timestamp is removed.

Figure 2:
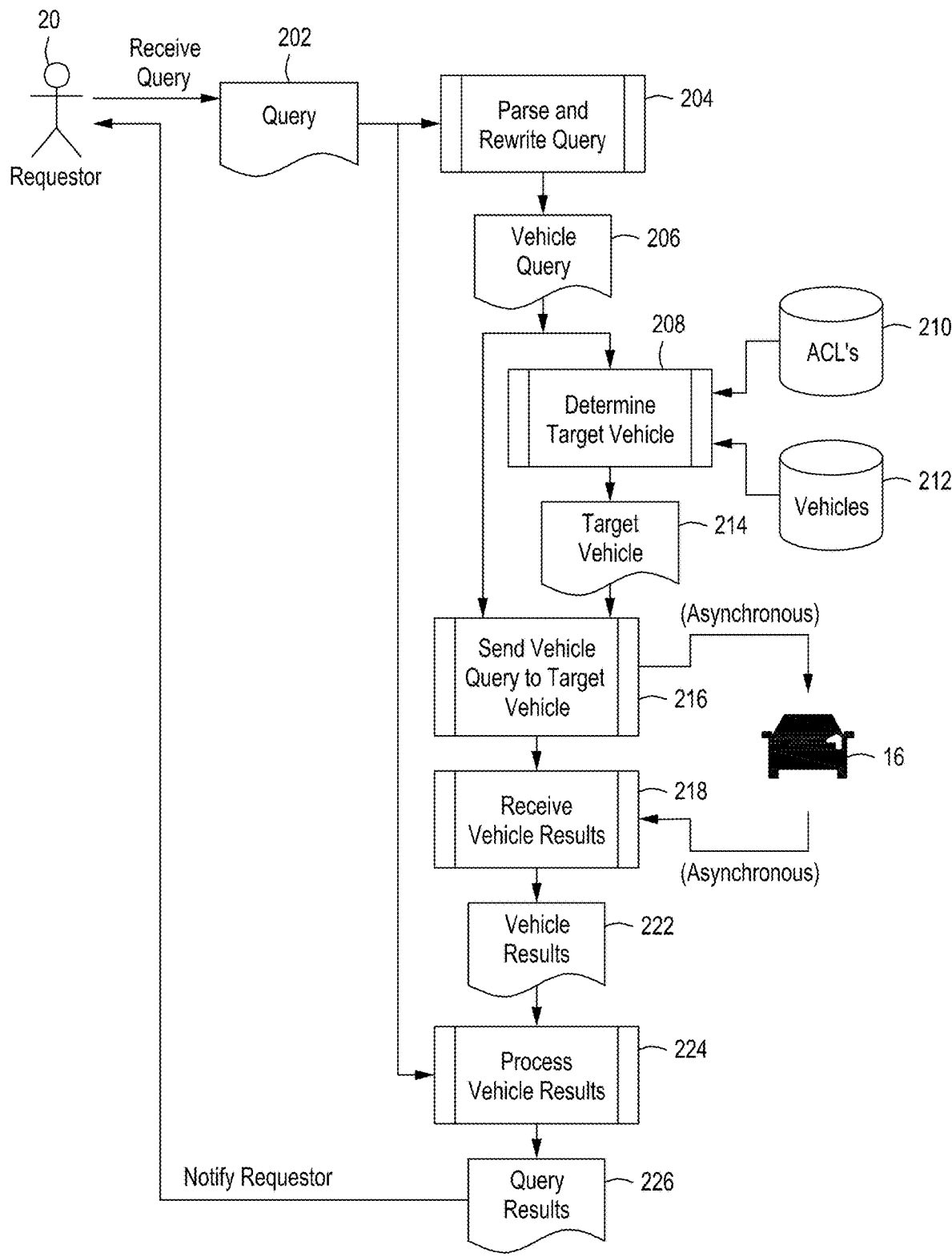
FIG. 2 is a flowchart of a method for translating and federating queries in a vehicle telematics system in accordance with an embodiment of the disclosure.

More in particular and with additional reference to FIG. 2 describes when system 10 receives a query. For example, a user 20 submits a query 202 to the system 10, along with the following parameters/metadata:

An optional query expiration timestamp: this will determine the time period during which the system 10 will attempt to collect data from vehicles 18 for this query.

An optional response rate threshold: this will determine how many vehicles 18 must return a response before the system 10 stops collecting data from vehicles for this query.

A priority level (HIGH or LOW, default to LOW): this will determine the priority at which the vehicle 16 will attempt to fulfill the data request.

For instance, a user 20 might make the following query: Compute the average trip distance over all trips taken in vehicles 18 of a certain make. If the user 20 wants to compute this quantity once, she would provide a response rate threshold—once this threshold is met, the system 10 will compute this quantity based on the data responses received and return this result to the user. On the other hand, if the user 20 wants this quantity to be continuously computed over some period of time, she would provide a query expiration timestamp.

In some embodiments, the system 10 can parse and rewrite the query at 204. For instance, the system 10 parses the user's 20 query and extracts the following query components:

An abstract vehicle query that represents a query against local vehicle data that should be executed on an individual vehicle 16.

A projection that defines the subset of vehicles 18 for which data is desired.

An aggregation that defines how the results of all vehicle queries should be aggregated into a final query result.

In generating the abstract vehicle query 206, it is desirable to push as much query processing to the vehicle 16 as possible—this helps meet the dual goals of reduced network costs and increased privacy by reducing the size of the data payload that is sent from the vehicle in its data response. Therefore in rewriting the user 16 query, the system 10 uses a query optimizer that pushes as much processing logic as possible down to the abstract vehicle query, while maintaining the requirement that it should be possible to combine all vehicle query results into a response to the original user query.

In the above example (average trip distance over all trips taken in vehicles 16 of a certain make):

the abstract vehicle query computes (i) the sum of trip distance over all trips for the vehicle and (ii) the number of trips for the vehicle;

the projection selects only the vehicles of the given make; and the aggregation computes the average trip distance by summing (i) over all vehicles to compute the total distance over all trips for all vehicles, summing (ii) over all vehicles to compute the total number of trips, and dividing the first sum by the second.

Figure 3:
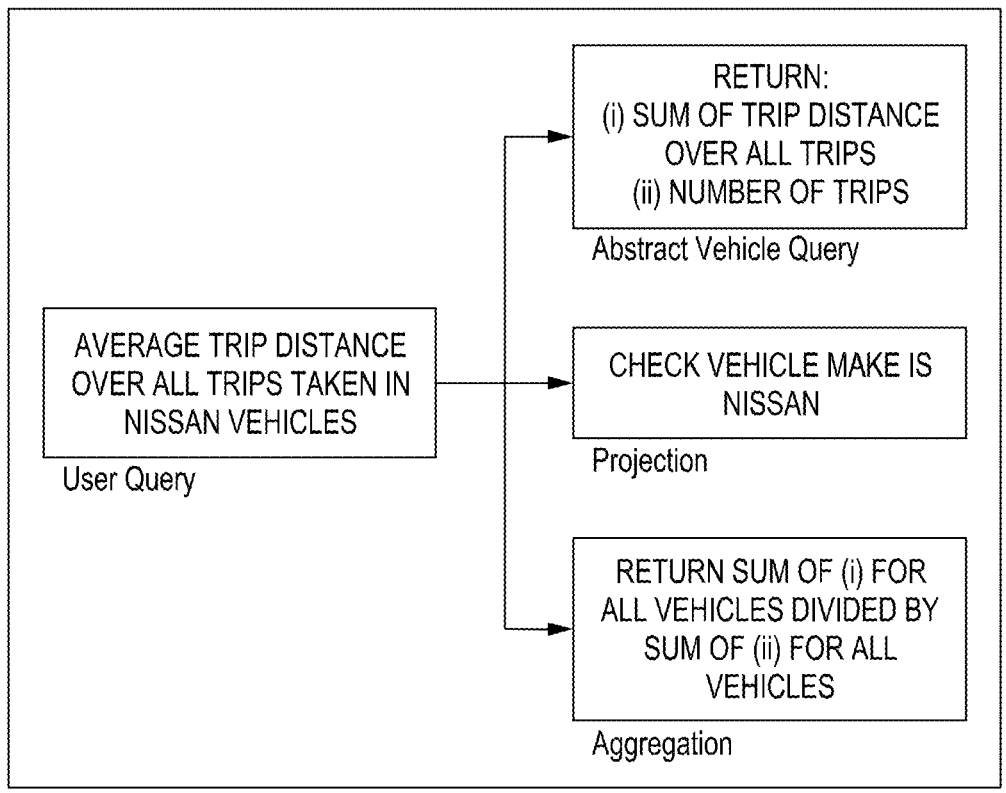
FIG. 3 is a flowchart of a method for user query parsing in a vehicle telematics system in accordance with an embodiment of the disclosure.

Note that the abstract vehicle query 206 has been optimized so that its response does not contain data for individual trips, but only aggregated trip data. FIG. 3 illustrates this example.

At this point, it is possible to leverage the abstract vehicle query 206 generated by the query optimizer to apply data governance rules based on the structure of the vehicle data response. For example, if the vehicle data response will return fine-grained location data, the system 10 might require elevated user 20 privileges. However if the vehicle data response only returns aggregated data from each vehicle 16, as in the example above, then the responses cannot leak sensitive information and elevated privileges would not be required.

The system 10 can also determine target vehicles 16 at 208. For example, the system 10 consults a database 212 containing information about all vehicles 18 to determine the subset of vehicles 16 that should be queried for data. System 10 uses 26 heuristics and an ensemble of classification algorithms 24 to determine this scope using the following using variables:

The projection derived from the user's 20 query.

Information on vehicle 16 capabilities provided by the vehicle database 212 (e.g. certain types of local data is collected by some vehicles but not others).

Access control lists 210 (ACLs) (certain vehicles 16 may only respond to data requests from users 20 with certain privileges).

At 216, the system 10 will also send data requests to the targeted vehicles 16. For instance, the system 10 takes the abstract vehicle query 206 described above, and the list of target vehicles 16 described above, and for each target vehicle it instantiates the abstract vehicle query into a vehicle data request. The structure of the vehicle data request is vehicle-specific and depends on the type and version of software running on each vehicle 16 (see more below). The system 10 sends a data request to each target vehicle 16. The metadata above (e.g., query expiration timestamp, response rate threshold, a priority level, etc.,) is sent with the data request if provided.

The system 10 will also receive data request results at 218. For example, each target vehicle 16 fulfills its data request and asynchronously returns the result to the system 10. The system 10 writes data request results 222 it receives to a data store. If an expiration timestamp was included in the data request, each vehicle 16 will continue to recompute and transmit its data request response on an ongoing basis until expiration, and the system 10 will continue to collect responses until expiration. The response frequency depends on the priority of the request (see more below). If no expiration timestamp was included in the data request, the vehicle 16 will compute and transmit the data request response a single time. The system 10 will continue collecting results 222 until the response rate threshold is reached. At this point in the process, the system 10 can be configured to allow each vehicle 16 to set access control rules that determine whether it will respond to data requests. For example, the owner of a vehicle 16 might consent to provide access to local vehicle data only at certain times or when the vehicle is in certain locations.

The system 10 will also process vehicle results 222 at 224. For instance, the system 10 takes the aggregation extracted from the original query above and uses it to compute the response to the user's 20 original query based on all received vehicle data responses. If the original query included an expiration timestamp, vehicle data responses will continue to arrive until the expiration timestamp. The same vehicle 16 will send updated data responses during this time period. In this scenario, the system 10 will re-compute the aggregation based on the latest received vehicle data on a regular basis. The system 10 will also send query results 226 to the user 20. For example, the system 10 sends the original query result 226 to the user 20. If the query result 226 is regularly recomputed over some time window, the latest result will be asynchronously communicated to the user 20 every time. If the user 20 specified a response rate threshold for the original query, the system 10 will wait until this threshold has been met to compute and send a response to the original query. While a query is running and vehicle data responses are being received, the system 10 is capable of reporting to the user 20 on the query's status and progress—how many vehicles 16 have been sending results and at what frequency, how many failed to complete the data request (because of an internal error, insufficient local data, insufficient permissions, etc.), and how many are unresponsive.

System 10 can work in heterogeneous networks. For instance, system 10 assumes a collection of heterogeneous vehicles 18, each running a software platform that 1) collects and persists telematics data locally, and 2) offers a Linux-based, for example, application runtime that provides applications query access to that data.

The vehicles 18 can be heterogeneous in the sense that the query interfaces and data formats are different for each vehicle 16, based on the implementation of the software that each vehicle runs.

In some embodiments, the software platform may be running on a system built into a vehicle 16, on an aftermarket system integrated with the vehicle (e.g. via OBDII), or in the case of mobile telematics, on a mobile device 28 that is physically coupled to, but not electronically integrated with, the vehicle. System 10 uses Linux because it is a widely adopted family of open source operating systems, but the system 10 also is compatible with other operating systems including closed proprietary operating systems. The AUTOSAR vehicle software platform is based on Linux. In the case of mobile telematics, the Android operating system that runs on many mobile devices is also Linux-based.

In system 10 it is assumed that there is a finite number of vehicle 18 software platforms, and that every vehicle 16 in the fleet is running a software application capable of communicating with the system and this is called the vehicle data agent. For instance, system 10 is aware of the software platform that each vehicle 16 runs, and is capable of converting an abstract query into a data request that can be understood by every vehicle's data agent.

Further, a vehicle data agent uses the following method to receive, store, evaluate, and respond to data requests:

The data agent asynchronously receives new data requests with corresponding metadata (expiration timestamp, priority) and stores them locally. The requests are sorted by priority with the HIGH priority requests first.

The data agent evaluates all stored data requests as often as necessary to provide up-to-date results. The HIGH priority requests are evaluated first and their results stored locally before the LOW priority requests are evaluated. Any requests that have expired are removed and no longer processed.

The data agent sends results asynchronously as needed to report new results as quickly as possible (this will depend on the underlying software platform). The results for HIGH priority requests are sent before the results for LOW priority requests.

In addition, there are other considerations as well such as advances in Internet of Things, Federated Machine Learning, and Differential Privacy. For example, given the rapid and recent advancement of algorithms in this space, the need for a robust foundational framework for deployment of new algorithms has become even more important. While system 10 supports different types of analytical and model-based querying at the moment, it can grow into a foundational base for more advanced analytics through federated machine learning and differential privacy methods. Furthermore, hardware advancements in Internet of Things will allow the system's 10 edge-based paradigm to be implemented in more devices and heterogeneous environments.

Furthermore, system 10 provides a vendor and framework agnostic design. For instance, in order to maximize the long-term potential and impact of system 10, the system's products are environment agnostic; e.g., the system can be deployed on multiple clouds such as Amazon Web Services and Google Cloud, and all parts of the system are implemented using open standards and vendor/framework-agnostic designs.

In some embodiments, system 10 is a system for federated data querying that rewrites data queries into an edge-friendly form that can be distributed across a fleet of vehicles 18 with heterogeneous architectures. This represents a fundamental paradigm shift in the collection of data from a heterogeneous population of vehicles 18. The nature of vehicle 16 data collection is complex. For instance, vehicles 18 generate a large amount of data by capturing their state (location, speed, status of internal systems, etc.) hundreds of times a second as well as events. Analysts, data scientists, software engineers, and other users 20 are frequently tasked with uncovering insights using this data across all vehicles 18 in order to accomplish a variety use cases, e.g., understand how different vehicles 16 are utilized (where and when they travel), or be informed when certain events take place at the vehicle level (such as an accident). These insights can be used to build applications and services. In the first example, the user 20 would feed the query result into an analytical dashboard 12 describing vehicle 16 utilization across the fleet, and in the second, into a roadside assistance system that automatically responds to detected accidents.

The nature of analysis and computation in system 10 is varied. It is noted that a majority of telematics based analytics involved the computation of classifications, aggregates, outliers, and trends, especially at the per-device (vehicle) level, followed by a possible post-computation at the cohort level. In the automotive sector, most telematics involved trend analysis for time series and aggregations over spatial data, such as heat-maps. In the insurance and actuarial industry, there is a prevalence of generalized linear models and statistical analysis on a per-vehicle basis. Additionally, system 10 uses that many aggregations can be either exactly or approximately converted to algebraic aggregations, i.e., for an $F(X \cup Y)$ there exist $G(\ )$ and $H(\ )$ such that $F(X \cup Y)=G(H(X), H(Y))$, for example $AVG(X+Y)=(SUM(X)+SUM(Y))/(COUNT(X)+COUNT(Y))$. This abstraction allows system 10 to simplify many analyses over fleets of vehicles 18 into aggregations that can be performed at the vehicle 16 itself.

For example, to calculate the "average miles traveled per day within the State of Ohio" histogram for a fleet of vehicles 18, each vehicle 16 can perform the geo-fencing task to filter Ohio-relevant data at the vehicle level, and then compute the SUM and COUNT at the vehicle level as well. After this, these computations can be sent to the processor 14, e.g. cloud, where the averages can be computed across all vehicles 18 in the fleet. By pushing the computation to the edge, system 10 thus avoided privacy issues of collecting location data, and also reduced network usage.

In contraposition, the conventional solution in this scenario is for each vehicle to transmit all of its local data, as the data is generated, to a centralized database owned by the operator. The operator can then run queries against this centralized data store. Though this solution is technologically simplest, it has three significant drawbacks:

Cost: if the number of vehicles is high, and the scale of data generated by each device is large, the network costs of transmitting all local data to the centralized data store become prohibitive. If the user is using a cloud database, the costs of storage and maintenance can also be enormous.

Privacy and security: if vehicles collect sensitive personal information (as is the case for vehicle, which track their drivers' location), then aggregating all local device data in a centralized data store introduces significant risk; if a malicious actor gains access to the centralized data store, the result is a catastrophic data leak of all personal information across all vehicles.

Data complexity: software architectures vary greatly across vehicles; there are seven major vehicle software standards used throughout the automotive sector. Reconciling data collected from these disparate systems is nontrivial.

Moreover, by federating data queries to vehicles 18, system 10 makes it possible to define and apply fine-grained device-level data governance rules around who can access each device's data and under what circumstances, further enhancing privacy and security. This level of flexibility is unprecedented in the collection of telematics data.

In other words, the system 10 works by accepting a data query from a user 20, and rewriting the query into asynchronous data requests that are federated across all vehicles 18. Each vehicle 16 fulfills the request based on its local data and sends the result to the system 10. The system 10 stores all received results, uses them to compute the result of the original user 20 query, and communicates this result to the user. To accomplish this system 10 uses the following techniques and methods described above with respect to FIGS. 1-3 to execute this process.

Figure 4:
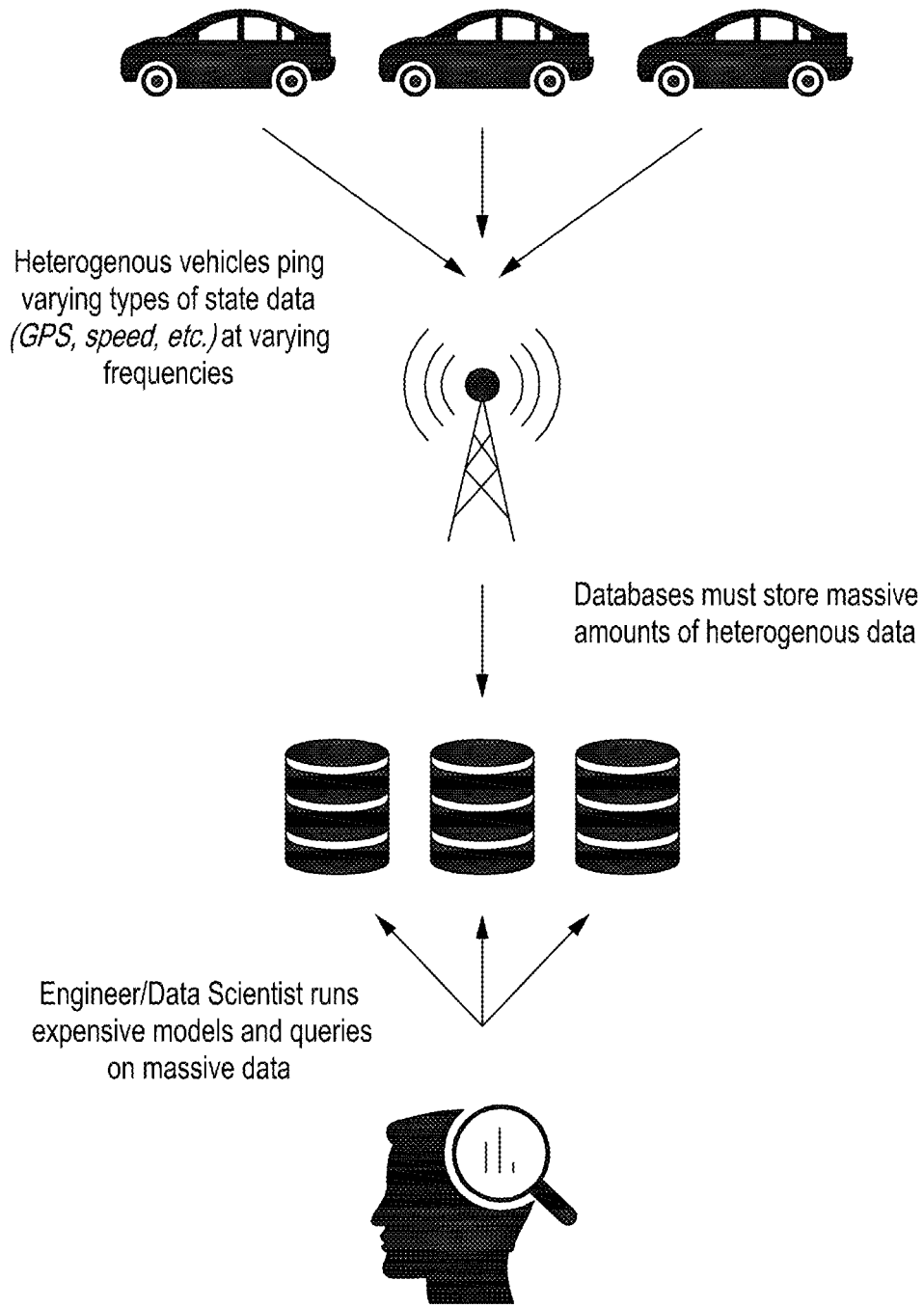
FIG. 4 is a diagram of a prior art vehicle telematics system.
Figure 5:
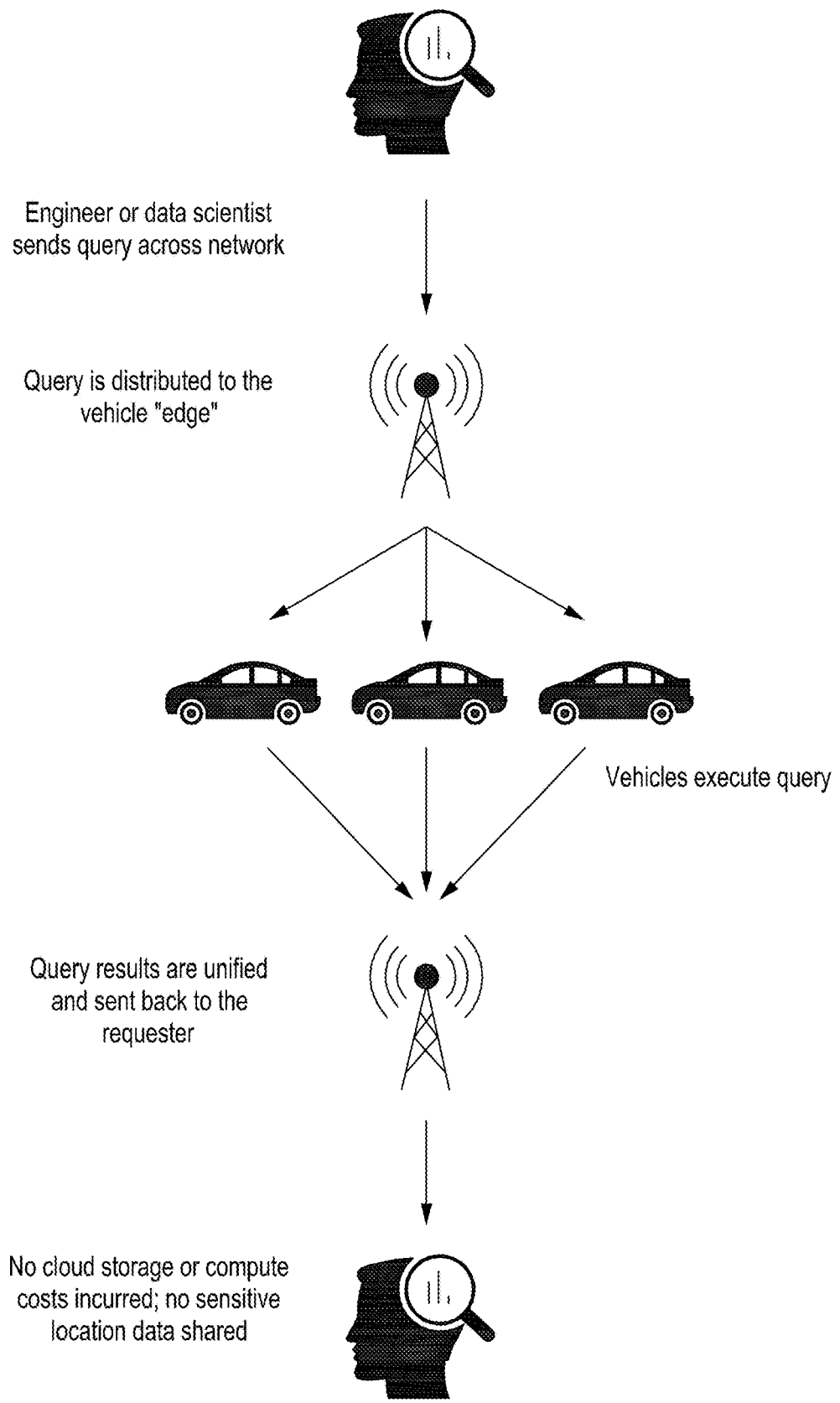
FIG. 5 is a diagram of a vehicle telematics system in accordance with an embodiment of the disclosure.

With additional reference to FIGS. 4-5, system's 10 shift to edge-computing represents a fundamental paradigm shift in the collection of data from a heterogeneous population of vehicles 18, thereby eliminating concerns related to cloud costs, privacy, and data engineering effort. The system 10 will allow developers and data scientists to specify a single declarative query/model, and this will be automatically rewritten to edge-friendly code and federated to devices at the edge. This drastically simplifies the process for the developer, and enhances long-term and privacy and maintainability for the vehicles 18 themselves. The comparison between FIGS. 4 and 5 illustrates how the system 10 solution stacks up to existing approaches. This approach is applicable to the three core forms of telematics data collection: OEM data systems, third-party onboard diagnostic devices, and cell-phone based telematics. In some embodiments, system 10 automatically rewrites and federates queries/models to the vehicle 16 edge. System 10 then unifies the data that is collected from each vehicle 16 and return a single result to the requester 20. System 10 also includes a collection algorithms to:

Write a single query that can execute on numerous vehicle 18 architectures, and

Harmonize the data collected by those vehicles into a unified result.

In some embodiments, the system 10 automatically rewrites telematics programs into an edge-friendly form that can be run at the edge device 16. By collecting insights at the edge, system 10 eliminates the need to send copious amounts of data over a network 32 for cloud storage. Instead, the only data collected is the insight needed. This paradigm shift accomplishes the following:

Cost: By limiting the scope of transmitted and stored data to just the analytics query/model results, the network infrastructure cost of supporting software and services driven by telematics data is greatly reduced.

Privacy & Regulatory: Most location-based use cases do not require actual GPS data, but semantic concepts that involve location. By focusing on derived insights and eliminating the collection of location data unless explicitly requested, consumer concerns can be mitigated and consumer privacy protection regulations (i.e., GDPR, CCPA) can be complied with.

Data Complexity: Reallocating the effort of unifying data produced by heterogeneous vehicle architectures to our software allows companies to spend human effort less on data engineering and more time collecting insights and improving customer experience.

In some embodiments, the system 10 automatically rewrites and federates analytics (i.e., queries, scores, linear expressions, predictive models) to the vehicle edge 16. System 10 then unifies the results and returns a single unified result to the user 20. This allows developers 20 to write a single query that can execute on numerous vehicle 18 architectures in an edge-friendly manner. More importantly, system's 10 approach removes the barrier to adoption. Existing edge computing solutions require users to expend enormous, manual effort migrating their applications to a new language or service. In contrast, system 10 automatic re-write capabilities allows developers 20 to use their existing software and languages without any additional effort. Ultimately, system's 10 technology has the power to restore consumer confidence in data sharing and save billions in IT spend.

In some embodiments, system 10 programmatically deploys insurance or other risk-related scores (filed, or unfiled) to be computed (in full, or as an intermediate representation) at the vehicle 16 or device 28.

In some embodiments, system 10 programmatically deploys analytics-based applications for connected vehicle 18 services, logistics, or location-based utilities such that the analytics are computed (in full, or as an intermediate representation) at the vehicle 16 or device 28.

In some embodiments, system 10 analyzes connected vehicle 18 applications and related analytics (for example but not limited to automotive services, insurance scoring, vehicle maintenance and leasing, driving feedback, smart city sensing, logistics, and ride hailing) into functions that can be deployed at the vehicle 16 or device 28 for edge-based or federated computing.

Because of the deficiencies of the system of FIG. 4, telematics-enabled products and services have not achieved widespread commercial maturity due to the way telematics data is currently collected and analyzed. Traditionally, telematics units in the vehicle send sensor data (e.g., GPS, odometer) to the cloud as frequently as hundreds of times a second. This introduces three key challenges in privacy, transmission cost, and data engineering.

Currently, telematics units in the vehicle send sensor data (e.g., GPS, braking, odometer) to the cloud as many as hundreds of times per second. This introduces three key challenges:

Privacy & Regulatory: According to a recent survey, nearly every consumer is increasingly aware and concerned about personal data privacy [2]. Given that telematics data contains GPS-based location data, consumers are circumspect to adopt technologies that can provide a lens into their day-to-day lives. In tandem, new regulations like the Global Data Protection Regulation (GDPR) and the California Consumer Privacy Act (CCPA) have arisen to enforce these consumer expectations. While these regulations are not yet ubiquitous, we expect privacy capabilities to become competitive differentiators and key considerations for future mobility consumers.

Simultaneously, we expect the regulatory environment to mature in the coming years and put in practice more frameworks and guidelines for businesses to adopt at a local, national, and global scale. Hence, businesses have a critical and unmet need for a capability to implement and adhere to these regulatory requirements.

Cost: The current paradigm cannot sustain large-scale adoption of vehicle connectivity due to pressure on bandwidth and cost of data storage. It is said that a connected vehicle can generate up to 25 GB of data an hour. In the long term, many experts predict this figure will climb to 5 TB as autonomous capabilities are integrated into the vehicle (near capacity for most cloud database management systems). Despite the pervasiveness of 3G, 4G/LTE, and now 5G networks, these transmission costs remain non-trivial at scale. Given that there are millions of vehicles on the road, network transmission costs and cloud costs become a critical concern. Few, if any, organizations have the resources and capital to accommodate these rapidly increasing demands, and justify these costs against business value.

Data Complexity and Heterogeneity: In 2017, there were 281 unique car models sold in the United States, of which 39 were newly introduced. Each possesses their own software architecture and data collection capabilities. To further complicate matters, many fleets purchase after-market devices (of which there are hundreds) to collect behavior insights. These conditions make it difficult to extract unified insights from a collection of vehicles. For example, a commercial auto insurer wanting to answer a single question across a diverse population of drivers would have to reconcile hundreds of different data models and systems.

In the automotive space, the barrier to adoption is extremely high due to technical inertia for telematics data processing. Existing platforms and solutions require users to manually migrate their applications to a new language or service. This involves countless hours of technical effort and complex migrations of legacy software.

System 10 better harnesses telematics data in view of concerns around safety, scale, security, and privacy/governance. Below are example use cases and pain points system 10 address across three customer segments: automakers, insurance providers, and fleet-based enterprises, summarized below:

Automakers (e.g., Honda, Ford):
    Sample Business Objectives Develop a centralized data querying hub
    Pain Points
        Size and administrative barriers prevent data from getting into the right hands
        Strength is hardware, not software; hosting telematics data is unprofitable
        Risk of infringing customer privacy rights Insurance Providers (e.g., Nationwide Insurance, StateAuto):
    Sample Business Objectives
        Detect crashes and predict level of severity
        Generate accurate driving behavior data to improve risk scoring and prices, regardless of vehicle model/make/year or telematics provider
        Offer premium services to encourage safer driving
        Mitigate consumer privacy concerns using responsible data permissioning
    Pain Points
        Telematics data is outside of traditional actuarial science
        May not have rights to host mobility data
        Risk of violating customer privacy rights
        Heterogeneity across telematics data sources Fleet-based Enterprises (e.g., XPO Logistics, Enterprise Rent-a-Car):
    Sample Business Objectives
        Predict maintenance based on actual sensor data
        Optimize fleets for safety, fuel consumption, and compliance
        Flag unsafe driving behavior or suggest routing changes in real time
    Pain Points
        Costly to hire dedicated staff to support mobility infrastructure
        Expensive to host telematics data In some embodiments, the system 10 communicates over a communications network 32, which enables a signal to travel anywhere within system 10 and/or to any other component/system connected to the system. The communications network 32 is wired and/or wireless, for example. The communications network 32 is local and/or global with respect to system 10, for instance.

Another aspect is a method that automatically rewrites telematics programs into an edge-friendly form that can be run at the edge device and allows users to distribute queries and models across a fleet of vehicles with heterogeneous architectures, which is now described with reference to flowchart 40 of FIG. 6. The method begins at Block 42 and may include receiving a first query via the input/output at Block 44. The method may also include generating an abstract vehicle query that represents a query against local vehicle data configured to be executed on an individual vehicle at Block 46. The method may further include sending the abstract vehicle query via the input/output device to each of a plurality of vehicles; receiving query results from each at Block 48. The method may additionally include receiving query results from each of the plurality of vehicles that executed the abstract vehicle query based upon local data from each of the plurality of vehicles respectively at Block 50. The method may also include computing an aggregated final query result based upon the abstract vehicle query and the query results from each of the plurality of vehicles at block 52. The method may further include transmitting the aggregated final query result to the input/output device at Block 54. The method ends at Block 56.

Figure 7:
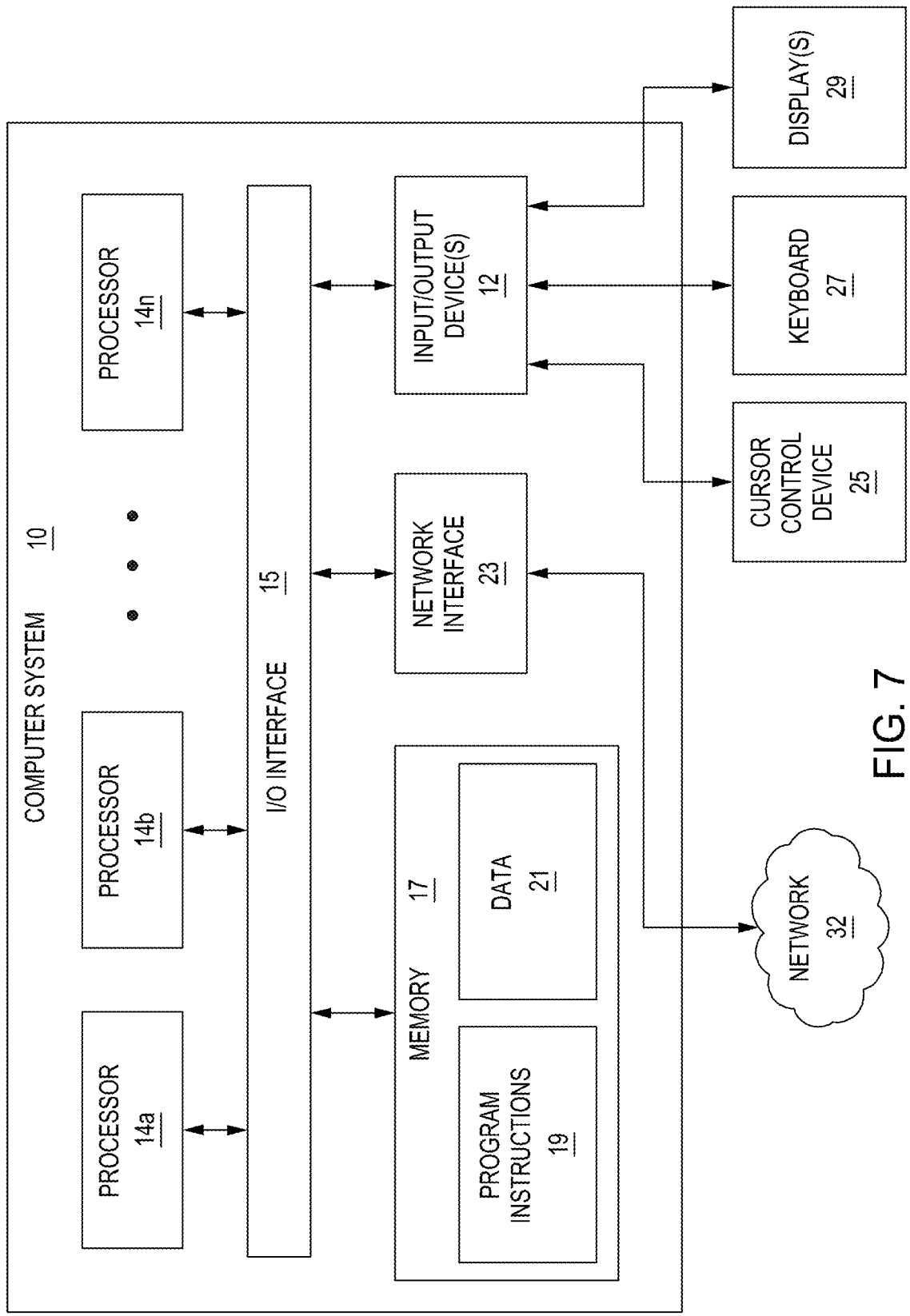
FIG. 7 is a depiction of a computer system that can be utilized in various embodiments of the invention.

FIG. 7 is a depiction of a computer system/apparatus 10 that can be utilized in various embodiments of the present invention. The computer system 10 comprises substantially similar structure comprising servers or electronic devices in the aforementioned embodiments.

Various embodiments of methods and system for routing active communication session data, as described herein, may be executed on one or more computer systems, which may interact with various other devices. One such computer system is computer system 10 illustrated by FIG. 7, which may in various embodiments implement any of the elements or functionality illustrated in FIGS. 1-6. In various embodiments, computer system 10 may be configured to implement methods described above. The computer system 10 may be used to implement any other system, device, element, functionality or method of the above-described embodiments. In the illustrated embodiments, computer system 10 may be configured to implement methods 36, 50, and 58 as processor-executable executable program instructions 19 (e.g., program instructions executable by processor(s) 14) in various embodiments.

In the illustrated embodiment, computer system 10 includes one or more processors 14a-14n coupled to a system memory 17 via an input/output (I/O) interface 15. Computer system 10 further includes a network interface 23 coupled to I/O interface 15, and one or more input/output devices 12, such as cursor control device 25, keyboard 27, and display(s) 29. In some embodiments, the keyboard 27 may be a touchscreen input device.

In various embodiments, any of the components may be utilized by the system 10 to route active communication session data described above. In various embodiments, a user interface may be generated and displayed on display 29. In some cases, it is contemplated that embodiments may be implemented using a single instance of computer system 10, while in other embodiments multiple such systems, or multiple nodes making up computer system 10, may be configured to host different portions or instances of various embodiments. For example, in one embodiment some elements may be implemented via one or more nodes of computer system 10 that are distinct from those nodes implementing other elements. In another example, multiple nodes may implement computer system 10 in a distributed manner.

In different embodiments, computer system 10 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In eight, or another suitable number). Processors 14 may be any suitable processor capable various embodiments, computer system 10 may be a uniprocessor system including one processor 14, or a multiprocessor system including several processors 14 (e.g., two, four, of executing instructions. For example, in various embodiments processors 14 may be general-purpose or embedded processors implementing any of a variety of instruction set architectures (ISAs). In multiprocessor systems, each of processors 14 may commonly, but not necessarily, implement the same ISA.

System memory 17 may be configured to store program instructions 19 and/or data 21 accessible by processor 14. In various embodiments, system memory 17 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 17. In other embodiments, program instructions and/or data may be received, sent or stored upon different types of computer-accessible media or on similar media separate from system memory 17 or computer system 10.

In one embodiment, I/O interface 15 may be configured to coordinate I/O traffic between processor 14, system memory 17, and any peripheral devices in the device, including network interface 23 or other peripheral interfaces, such as input/output devices 12. In some embodiments, I/O interface 15 may perform any necessary protocol, timing or other data transformations to convert data signals from one component (e.g., system memory 17) into a format suitable for use by another component (e.g., processor 14). In some embodiments, I/O interface 15 may include support for devices attached through various types of peripheral buses, such as a variant of the Peripheral Component Interconnect (PCI) bus standard or the Universal Serial Bus (USB) standard, for example. In some embodiments, the function of I/O interface 15 may be split into two or more separate components, such as a north bridge and a south bridge, for example. Also, in some embodiments some or all of the functionality of I/O interface 15, such as an interface to system memory 17, may be incorporated directly into processor 14.

Network interface 23 may be configured to allow data to be exchanged between computer system 10 and other devices attached to a network (e.g., network 32), such as one or more external systems or between nodes of computer system 10. In various embodiments, network 32 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 23 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 12 may, in some embodiments, include one or more display terminals, keyboards, keypads, touchpads, touchscreens, scanning devices, voice or optical recognition devices, or any other devices suitable for entering or accessing data by one or more computer systems 10. Multiple input/output devices 12 may be present in computer system 10 or may be distributed on various nodes of computer system 10. In some embodiments, similar input/output devices may be separate from computer system 10 and may interact with one or more nodes of computer system 10 through a wired or wireless connection, such as over network interface 23.

Figure 6:
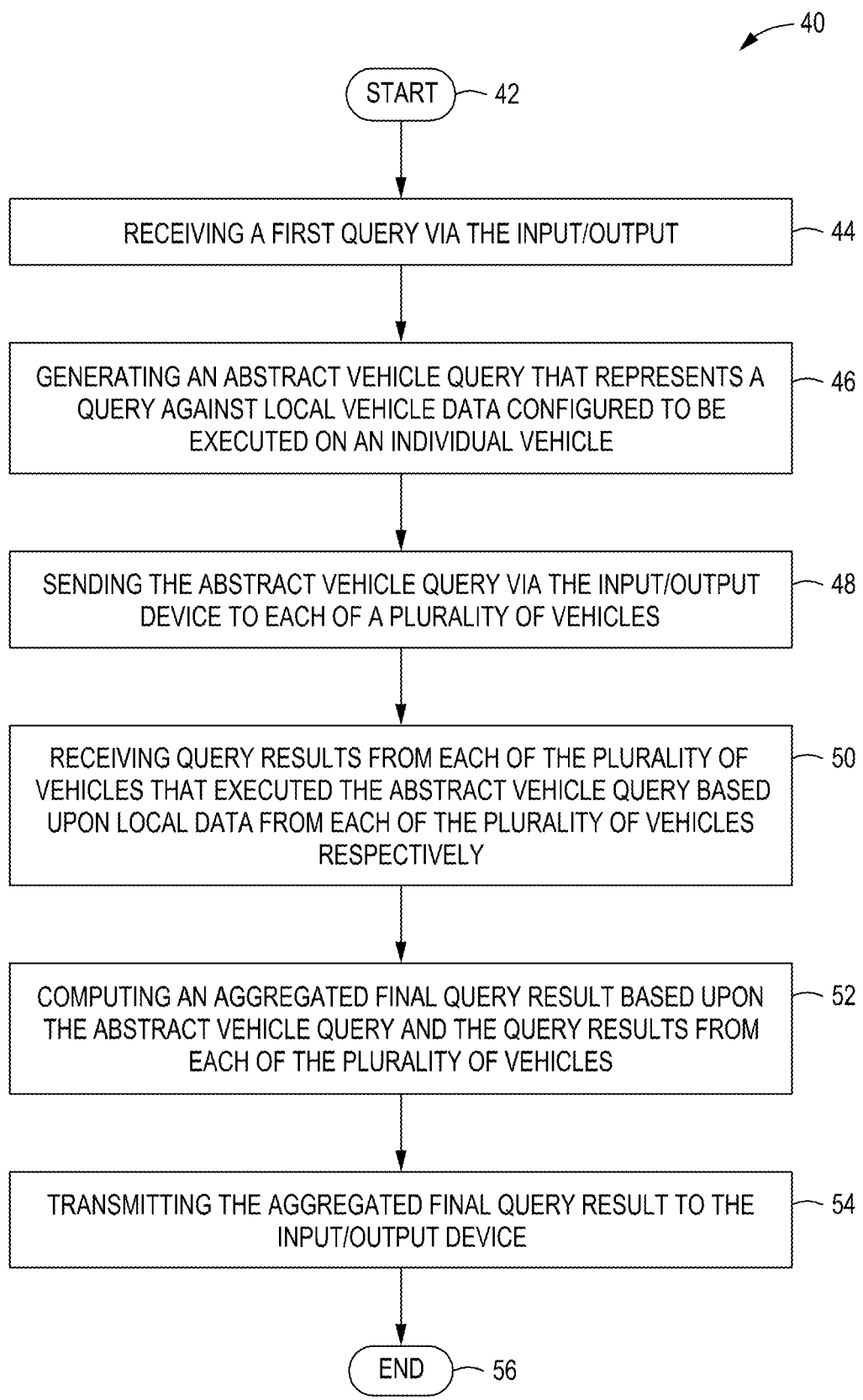
FIG. 6 is a flowchart of a method for vehicle telematics in accordance with an embodiment of the disclosure.

In some embodiments, the illustrated computer system may implement any of the methods described above, such as the methods illustrated by the flowchart of FIGS. 3, 4, and 6. In other embodiments, different elements and data may be included.

Those skilled in the art will appreciate that computer system 10 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 10 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 10 may be transmitted to computer system 10 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A system comprising:
an input/output device; and
a processor programmed to:
receive a first query via the input/output device;
generate, based on the first query, an abstract vehicle query that represents a query against local vehicle data configured to be executed on an individual vehicle;
send the abstract vehicle query via the input/output device to each of a plurality of vehicles;
receive query results from each of the plurality of vehicles that executed the abstract vehicle query based upon local data from each of the plurality of vehicles respectively;
compute an aggregated final query result based upon the abstract vehicle query and the query results from each of the plurality of vehicles; and
transmit the aggregated final query result to the input/output device.

2. The system of claim 1, wherein the aggregated final query result includes a statistical summary of how the results from each of the plurality of vehicles are at least one of configured into groups and identified as statistical outliers.

3. The system of claim 1, wherein the plurality of vehicles are at least one of restricted according to a platform limitation for each of the plurality of vehicles respectively, according to an access control list for each of the plurality of vehicles respectively, and the plurality of vehicles queried is restricted by at least one of a classification algorithm and a heuristic.

4. The system of claim 1, wherein the first query and abstract vehicle query request vehicle telematics data collected by the vehicle or a device connected to the vehicle.

5. The system of claim 1, wherein the abstract vehicle query includes a timestamp where each of the plurality of vehicles will continue to re-execute and send its query result on an ongoing basis until expiration, and the system will continue to collect query results until expiration.

6. The system claim 5, wherein the abstract vehicle query includes a priority level that controls abstract vehicle query order of at least one of execution, storage, and response by each vehicle.

7. The system of claim 6, wherein the priority level includes a high priority level that is executed before a low priority level, and wherein a high priority level query result is transmitted to the processor before a low priority level query result, and any abstract vehicle query with an expired timestamp is removed.

8. The system of claim 1, wherein the abstract vehicle query includes a response rate threshold and the system will wait until the response rate threshold has been met to compute and transmit the query result of the abstract vehicle query.

9. The system claim 1, wherein the abstract vehicle query while running and query results are being received, the system reports on the abstract vehicle query's status and progress including at least one of how many of the plurality of vehicles have been sending query results and at what frequency, how many failed to complete the abstract vehicle query, and how many are unresponsive.

10. A method comprising:
receiving a first query via an input/output device;
generating, based on the first query, an abstract vehicle query that represents a query against local vehicle data configured to be executed on an individual vehicle;
sending the abstract vehicle query via the input/output device to each of a plurality of vehicles;
receiving query results from each of the plurality of vehicles that executed the abstract vehicle query based upon local data from each of the plurality of vehicles respectively;
computing an aggregated final query result based upon the abstract vehicle query and the query results from each of the plurality of vehicles; and
transmitting the aggregated final query result to the input/output device.

11. The method of claim 10, wherein the aggregated final query result includes a statistical summary of how results from each of the plurality of vehicles are at least one of configured into groups and identified as statistical outliers.

12. The method of claim 10, wherein the plurality of vehicles are at least one of restricted according to a platform limitation for each of the plurality of vehicles respectively, according to an access control list for each of the plurality of vehicles respectively, and the plurality of vehicles queried is restricted by at least one of a classification algorithm and a heuristic.

13. The method of claim 10, wherein the first query and abstract vehicle query request vehicle telematics data collected by the vehicle or a device connected to the vehicle.

14. The method of claim 10, wherein the abstract vehicle query includes a timestamp where each of the plurality of vehicles will continue to re-execute and send its query result on an ongoing basis until expiration, and wherein query results are collected until expiration.

15. The method of claim 14, wherein the abstract vehicle query includes a priority level that controls abstract vehicle query order of at least one of execution, storage, and response by each vehicle.

16. The method of claim 15, wherein the priority level includes a high priority level that is executed before a low priority level, a high priority level query result is transmitted before a low priority level query result, and any abstract vehicle query with an expired timestamp is removed.

17. The method of claim 10, wherein the abstract vehicle query includes a response rate threshold, and wherein the query result of the abstract vehicle query is not computed or transmitted until the response rate threshold has been met.

18. The method claim 10, wherein the abstract vehicle query while running and query results are being received, the system reports on the abstract vehicle query's status and progress including at least one of how many of the plurality of vehicles have been sending query results and at what frequency, how many failed to complete the abstract vehicle query, and how many are unresponsive.

19. A non-transitory computer readable storage medium having stored thereon a plurality of instructions that when executed by a processor of an asset management apparatus perform a method for asset management comprising:
receiving a first query via the input/output;
generating, based on the first query, an abstract vehicle query that represents a query against local vehicle data configured to be executed on an individual vehicle;
sending the abstract vehicle query via the input/output device to each of a plurality of vehicles;
receiving query results from each of the plurality of vehicles that executed the abstract vehicle query based upon local data from each of the plurality of vehicles respectively;
computing an aggregated final query result based upon the abstract vehicle query and the query results from each of the plurality of vehicles; and
transmitting the aggregated final query result to the input/output device.

20. The non-transitory computer readable storage medium of claim 19, wherein the aggregated final query result includes a statistical summary of how results from each of the plurality of vehicles are at least one of configured into groups and identified as statistical outliers.

\* \* \* \* \*